United States Patent Office 3,598,811
Patented Aug. 10, 1971

3,598,811
DERIVATIVES OF 4α,8,14-TRIMETHYL-18-NOR-5α,
8α,9β,13α,14β,17α-PREGNANE
Hans U. Immer, St. Laurent, Quebec, Canada, assignor to Ayerst, McKenna & Harrison, Limited, St. Laurent, Quebec, Canada
No Drawing. Filed Sept. 2, 1969, Ser. No. 854,734
Int. Cl. C07c *173/00*
U.S. Cl. 260—239.55
13 Claims

ABSTRACT OF THE DISCLOSURE

There are disclosed herein 3α,3β-(ethylenedioxy)-4α,8,14-trimethyl-18-nor-5α,8α,9β,13α,14β,17α-pregnan-20-one, 4α,8,14-trimethyl-18-nor-5α,8α,9β,13α,14β,17α-pregnane-3,20-dione, and 3β-hydroxy-4α,8,14-trimethyl-18-nor-5α,8α,9β,13α,14β,17α-pregnan-20-one as well as its 3-tetrahydropyranyl ether and its 3-acetate, and intermediates used in their syntheses. The compounds have cholesterol-lowering and antibacterial activities, and methods for their preparation and use are also disclosed.

BACKGROUND OF THE INVENTION

The present invention relates to derivatives of 4α,8,14-trimethyl-18-nor-5α,8α,9β,13α,14β,17α-pregnane, to a process for preparing the above compounds and to intermediates used in their synthesis. The compounds of this invention may be represented by the following Formula I

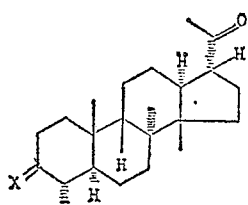

I.

in which X represents a divalent radical selected from the group consisting of O= (ketonic oxygen), acetals and mercaptals of the formulae

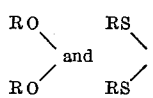

in which R represents a lower alkyl group, ketals and thioketals of the formulae

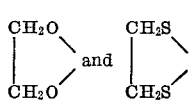

and the group

in which $R^1$ is selected from the group consisting of hydrogen, an aliphatic acyl group containing from 2–4 carbon atoms, and the tetrahydropyranyl group.

The compounds of this invention are useful as agents inhibiting cholesterol biosynthesis and as anti-bacterial agents. Moreover, the compound of this invention 4α,8,14-trimethyl-18-nor-5α,8α,9β,13α,14β,17α-pregnane-3,20-dione (I, X=O), preferably in the form of its 3-ethylene ketal, or the compound 3β-hydroxy-4α,8,14-trimethyl-18-nor-5α,8α,9β,13α,14β,17α-pregnan-20-one (I, X= 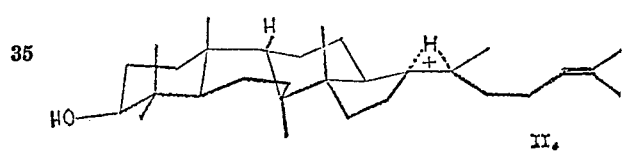, $R^1$=H, $CH_3CO$, tetrahydropyranyl)

preferably in the form of its 3-acetate or 3-tetrahydropyranyl ether, are useful as intermediates in the preparation of 31-norprotost-24-ene-3β,20R-diol (III, R=H), which differs from protost-24-ene-3β,20R-diol (III, R=CH₃) only by the absence of the 31-methyl group in position 4.

The cation of said last-named compound may be represented by Formula II

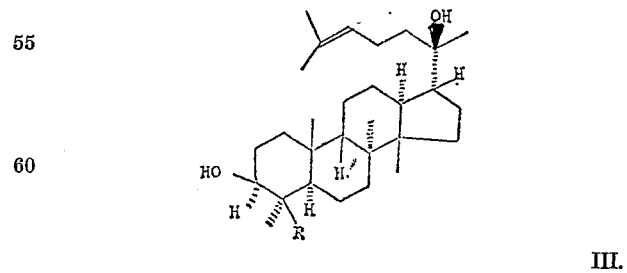

and was postulated as the initial cyclisation intermediate in the biological transformation of squalene to lanosterol, a key step in the biogenesis of cholesterol, by Eschenmoser, Ruzicka, Jeger, and Arigoni in Helv. Chim. Acta Vol. 38, p. 1890 (1955), and protost-24-ene-3β,20R-diol of the Formula III (R=CH₃) has lately been postulated as a possible intermediate in the same biological transformation process by E. J. Corey et al. in J. Am. Chem. Soc., vol. 90, p. 6254 (1968) and vol. 91, p. 2134 (1969).

31-nor-protost-24-ene-3β,20R-diol of the Formula III (R=H)

III.

may be prepared from the compounds of this invention 4α,8,14 - trimethyl - 18 - nor-5α,8α,9β,13α,14β,17α-pregna-3,20-dione, preferably in the form of its 3-ethylene ketal, or from 3β - hydroxy - 4α,8,14-trimethyl-18-nor-5α,8α,9β,13α,14β,17α-pregnan-20-one or from its 3-acetate or 3-tetrahydropyranyl ether, by reacting any of said last-named compounds with a Grignard reagent prepared from a suitable 1-halo-4-methyl-pent-3-ene. The Grignard reaction takes place on the 20-keto group, and either hydrolysis of the protective ketal group followed by reduction of the resulting 3-ketone, or removal of the protective 3-tetrahydropyranyl group then yields 31-nor-protost-24-ene-3β,20R-diol.

SUMMARY OF THE INVENTION

The compounds of this invention may be prepared as follows:

I prefer to use as starting material the compound 3α-hydroxy - 4α,8,14 - trimethyl - 18 - nor-5α,8α,9β,13α,14β-androst-17-one (IVa) or its 13β-isomer 3α-hydroxy-4α,8,14-trimethyl-18-nor-5α,8α,9β,14β-androst-17-one (IVb) or the 3-acetate thereof (IVc), all of them prepared as described by Diassi et al. in Tetrahedron vol. 22, p. 3459 (1966). Any one of the above three compounds is reacted with a Wittig reagent prepared from an alkali metal hydride, preferably sodium hydride, and ethyltriphenyl phosphonium iodide in an inert solvent, preferably dimethylsulfoxide, to yield 4α,8,14-trimethyl-18-nor-5α,8α,9β,13ξ,14β-pregn-17(20)en-3α-ol (V).

Said last-named compound is reacted with N,N'-dicyclohexylcarbodiimide in an inert solvent, preferably dimethylsulfoxide, and in the presence of an organic base, preferably pyridine, and of an acid, preferably trifluoroacetic acid, to yield 4α,8,14-trimethyl-18-nor-5α,8α,9β,13ξ,14β-pregn-17(20)-en-3-one (VIa), which is transformed to its corresponding 3-ketal (VIb), by treatment with ethylene glyco in the presence of a non-volatile anhydrous acid, preferably p-toluensulfonic acid. In a similar manner, the 3-ketone group may also be protected by formulation of a thioketal, acetal, or mercaptal.

Said ketal of Formula VIb is treated with diborane in an inert anhydrous solvent at a low temperature, preferably in tetrahydrofuran at −70° to −40° C., and the mixture is then treated with hydrogen peroxide in the presence of a strong base at a temperature of from −10° C. to +10° C., preferably using sodium hydroxide at about 0° C., to yield 3α,3β-(ethylenedioxy)-4α,8,14-trimethyl-18-nor-5α,8α,9β,13ξ,14β-pregnan-20ξ-ol (VIIa), obtained as a mixture of the respective 20α- and 20β-ols which may be separated, but which is preferably used in the subsequent step without separation.

Said mixture of the two isomers of the Formula VIIa is treated with an oxidizing agent in a basic medium preferably chromium trioxide in pyridine, to yield the corresponding 20-ketone, 3α,3β-(ethylenedioxy)-4α,8,14-trimethyl-18-nor - 5α,8α,9β,13α,14β - pregnan - 20 - one (VIIIa). Treatment of said last-named compound with a strong base dissolved in a lower alkanol, preferably aqueous potassium hydroxide in methanol, isomerizes the side chain in position 17 and yields 3α,3β-(ethylenedioxy)-4α,8,14 - trimethyl - 18 - nor-5α,8α,9β,13α,14β,17α-pregnan-20-one (Ia). Removal of the 3-ketal group of said last-named compound by treatment with dilute aqueous acid yields 4α,8,14-trimethyl - 18 - nor-5α,8α,9β,13α,14β,17α-pregnane-3,20-dione (Ib).

The above sequence of reactions may also be carried out with the corresponding compounds in which the 3-keto group is protected by formation of a thioketal, an acetal, or a mercaptal, to yield the compounds of Formula I in which X represents the group

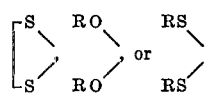

When it is desired to obtain the compounds of Formula I in which X represents the group

in which $R^1$ is as defined above, the compound of Formula VIIa is acylated in position 20, the resulting 20-acylate (VIIb) is treated with a dilute aqueous acid to obtain the corresponding 3-ketone (VIIc), which is reduced to the corresponding 3β-hydroxy derivative (VIId) and the latter compound is converted to the corresponding 3-tetrahydropyranyl ether (VIIe). Basic hydrolysis of the 20-acylate group yields the corresponding 20ξ-ol (VIIf) which is oxidized to the corresponding 20-ketone (VIIIb) and treated with a strong base to yield the 3-tetrahydropyranyl ether of 3β-hydroxy-4α,8,14-trimethyl-18-nor-5α,8α,9β,13α,14β,17α-pregnan-20-one (Ic). Treatment of said last-named compound with a dilute aqueous acid yields 3β-hydroxy-4α,8,14-trimethyl-18-nor-5α,8α,9β,13α,14β,17α-pregnan-20-one (Id), which may be acylated, for example acetylated, to yield 3β-hydroxy-4α,8,14-trimethyl-18-nor-5α,8α,9β,13α,14β,17α-pregnan-20-one acetate (Ie).

The following formulae in which THP represents the 2-tetrahydropyranyl group, and $R^2$, $R^3$ and X are as defined will illustrate this invention.

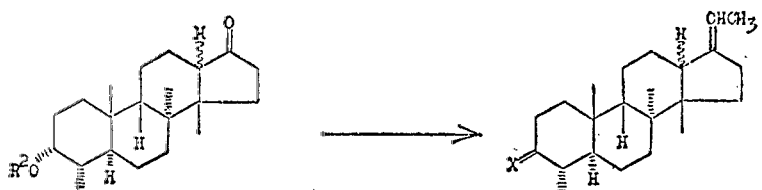

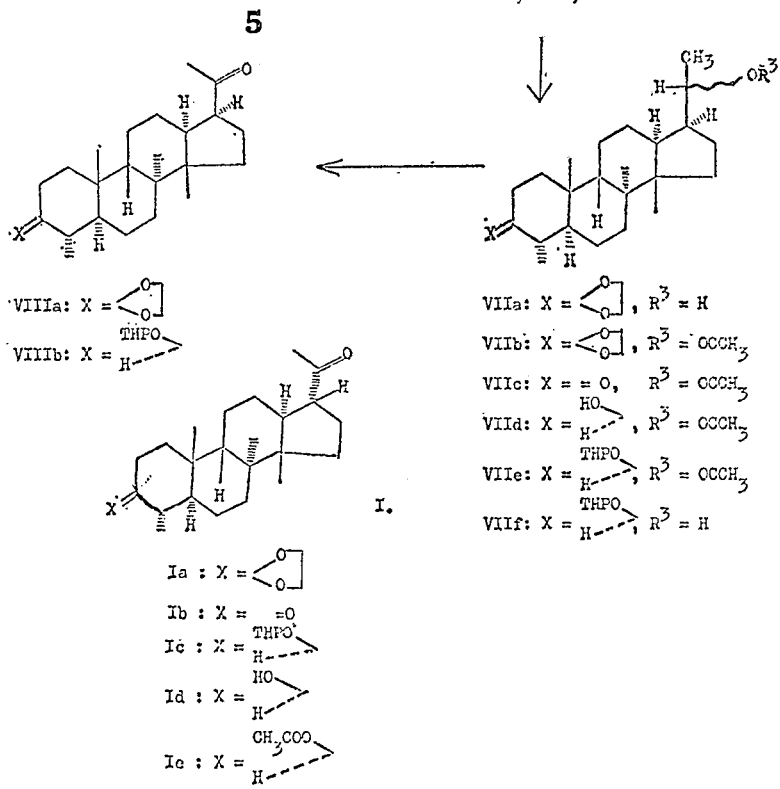

The new and novel compounds of this invention of Formula I in which X is as defined in the first instance have been found to possess interesting pharmacological properties. More particularly, these compounds, in standard pharmacological tests, for example, in procedures similar to the in vitro test described by Bucher in J. Am. Chem. Soc. vol. 75, p. 498 (1953), or to the in vivo test described by Duncan and Best in Amer. J. Clin. Nutr. vol. 10, p. 297 (1962) for the testing of cholesterol-lowering agents, or in a procedure similar to that described by Grove and Randall in "Assay Methods of Antibiotics," Medical Encyclopedia Inc., New York 1955, have exhibited utility as chloresterol-lowering and as antibacterial agents.

When the compounds of this invention are employel as cholesterol-lowering agents in warm-blooded animals, e.g. rats, alone or in combination with pharmacologically acceptable carriers, the proportion of such carriers is determined by the solubility and chemical nature of the compound, chosen route of administration and standard biological practice. For example, the compounds may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.1 mg. to about 20 mg. per kilo per day, although as aforementioned variations will occur. However, a dosage level that is in the range of from about 0.5 mg. to about 5 mg. per kilo per day is most desirably employed in order to achieve effective results.

When the compounds of this invention are employed as antibacterial agents they have been found to be effective against a variety of gram-positive and gram-negative organisms such as, for example, *Staphylococcus pyogenes* (both penicillin-resistant and penicillin-sensitive strains), *Sarcina lutea, Streptococcus faecalis, Escherichia coli, Aerobacter aerogenes, Salmonella pullorum, Pseudomonas aeruginosa, Proteus vulgaris* or *Proteus mirabilis*. As antibacterial agents they are most effective when used topically, and are preferably employed in the form of solutions, creams, or lotions in pharmaceutically acceptable vehicles containing from 0.1–10 percent of the active ingredient, such solutions, creams, or lotions to be applied to infected areas of the skin from one to three times daily.

When it is desired to use the compounds of this invention as intermediates in the synthesis of 31-nor-protost-24-ene-3β,20R-diol (III) the compound 4α,8,14-trimethyl-18-nor-5α,8α,9β,13α,14β,17α-pregnane-3,20-dione (Ib) is preferably employed as its 3α,3β-(ethylenedioxy) derivative of the Formula Ia. Said last-named compound is treated with a Grignard reagent prepared from 1-chloro-, 1-bromo-, or 1-iodo-4-methyl-pent-3-ene, preferably from 1-bromo-4-methyl-pent-3-ene, to yield 3α,3β-(ethylenedioxy)-31-nor-protost-24-en-20R-ol (IXa), from which the corresponding 3-ketone, 20R-hydroxy-31-nor-protost-24-en-3-one (IXb) is obtained by treatment with an aqueous acid, preferably acetic acid. Said last-named compound is in turn treated with an alkali metal borohydride in solution in a mixture of inert solvents, preferably with sodium borohydride in a mixture of dimethoxyethane and methanol, to yield 31-nor-protost-24-ene-3β,20R-diol (III, R=H). The following formulae will illustrate this transformation.

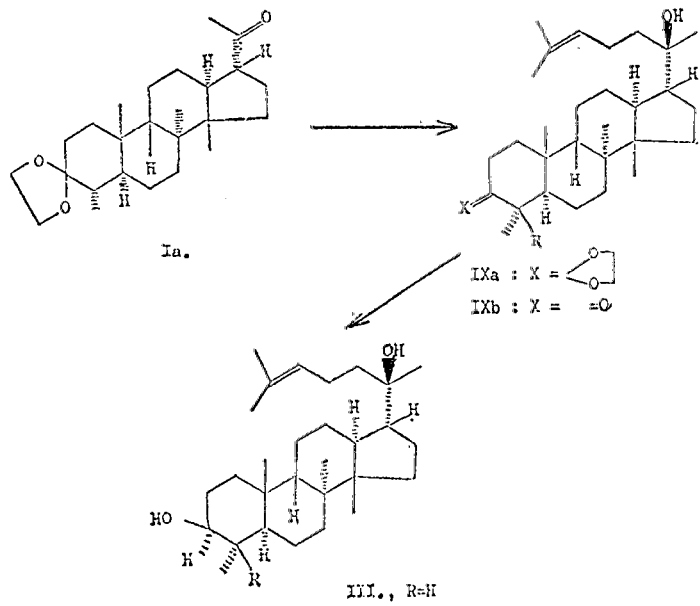

DETAILED DESCRIPTION OF THE INVENTION

More specifically, a Wittig reagent is prepared from sodium hydride and ethyltriphenyl phosphonium iodide in dimethylsulfoxide solution, and 3α-hydroxy-4α,8,14-trimethyl-18-nor-5α,8α,9β,13α,14β-androst-17-one (IVa) or its 13β-isomer 3α-hydroxy-4α,8,14-trimethyl-18-nor-5α,8α,9β,14β-androst-17-one (IVb) or the 3-acetate (IVc) of sail last-named compound is added. The mixture is heated to 50–90° C., preferably about 70° C., for 8–24 hours, preferably for 12 hours, cooled, quenched with water, and extracted with a water-immiscible solvent, preferably diethyl ether. Evaporation of the solvent and chromatography of the residue yields 4α,8,14-trimethyl-18-nor-5α,8α,9β,13ξ,14β-pregn-17,(20)-en-3α-ol (V) as a mixture of its four possible isomers which is used as such in the subsequent step.

Treatment of the above mixture with N,N'-dicyclohexylcarbodiimide in dimethylsulfoxide solution and in the presence of pyridine, followed by addition of trifluoroacetic acid and stirring at 10–30° C., preferably at about 20° C., for 8–24 hours, preferably for about 12 hours, filtration, addition of water to the filtrate and extraction with a water-immiscible solvent, preferably ethyl acetate, yields the corresponding 3-ketone, 4α,8,14-trimethyl-18-nor-5α,8α,9β,13ξ,14β-pregn-17(20)-en-3-one (VIa) which is purified by chromatography. Said last-named compound is again obtained as a mixture of its four possible isomers which is not separated but treated as such with ethylene glycol in solution in an inert solvent, preferably benzene, in the presence of an anhydrous non-volatile acid, preferably p-toluenesulfonic acid, at 60–90 C., preferably at the boiling point of the mixture, extracted with water, the solvent evaporated and the residue chromatographed, to yield the corresponding 3-ketal, 3α,3β-(ethylenedioxy) - 4α,8,14-trimethyl - 18 - nor-5α,8α,9β,13ξ,14β-pregn-17(20)-ene (VIb) as the mixture of its four possible isomers. Alternatively, the compounds of Formula VIa may also be reacted with ethylenedithiol in an anhydrous inert solvent in the presence of an anhydrous strong acid to yield the corresponding thioketal, 3α,3β-(ethylenedithio) - 4α,8,14 - trimethyl-18-nor-5α,8α,9β,13ξ,14β-pregn-17(20)-ene. In a similar manner, the compound of Formula VIa may also be reacted with methyl or ethyl orthoformate in the presence of methanol or ethanol, or with methyl or ethyl mercaptan in the presence of a small amount of an anhydrous acid, to yield the corresponding acetal or mercaptal, 3α,3β-dimethoxy- or -diethoxy- or 3α,3β-dimethylthio- or -diethylthio-4α,8,14-trimethyl-18-nor-5α,8α,9β,13ξ,14β-pregn-17(20)-ene, respectively.

Said mixture of Formula VIb is dissolved in an anhydrous inert solvent, preferably tetrahydrofuran, and is treated with diborane at —70° C., to —40° C., preferably at —60° C., with exclusion of moisture and atmospheric oxygen, preferably under a blanket of dry nitrogen, for 8–24 hours, preferably for about 12 hours. The mixture is allowed to come to about 0° C., and treated with an aqueous base, preferably sodium hydroxide, and hydrogen peroxide at about 0° C. for 1–2 hours. Extraction with a water-immiscible solvent, preferably diethyl ether, followed by chromatography yields mainly 3α,3β-(ethylenedioxy)-4α,8,14-trimethyl - 18 - nor-5α,8α,9β,13α,14β-pregnan-20ξ-ol (VIIa) as a mixture of its 20α and 20β-isomers which may be separated by chromatography, but which is preferably used as such in the subsequent step. As a bf-product there is obtained 3α,3β-(ethylenedioxy)-4α,8,14-trimethyl-18-nor-5α,8α,9β,14β - pregn-13(17)-ene, as isomer of the starting material VIb for this reaction step.

It is a particular advantage of the process of this invention that the addition of the elements of water described in the above step is favoured by the 13a configuration to yield the desired product of Formula VIIa while the 13β-isomer of the starting material of Formula VIb does not add the elements of water in the desired manner, but rather forms the by-product named above. In this manner, a mixture of only two isomers of the compound of Formula VIIa are obtained instead of the four possible isomers which could have been expected.

Treatment of said last-named mixture with chromium trioxide in pyridine solution at 10–30° C. for 8–24 hours, preferably at about 20° C. for 12 hours, yields the corresponding 20-ketone, 3α,3β-(ethylenedioxy)-4α,8,14-trimethyl-18-nor-5α,8α,9β,13α,14β - pregnan-20-one (VIIIa) as a single well-defined compound.

Said last-named compound is isomerized to its corresponding 17α-pregnane derivative by treatment with a base in solution in a lower alkanol, preferably potassium hydroxide in ethanol, to yield 3α,3β-(ethylenedioxy)-4α,-8,14-trimethyl - 18 - nor-5α,8α,9β,13α,14β,17α-pregnan-20-one (Ia), which, upon treatment with an aqueous acid, yields the corresponding 3-ketone, 4α,8,14-trimethyl-18-nor-5α,8α,9β,13α,14β,17α-pregnan-3,20-dione (Ib).

The sequence of reaction steps represented by the formulae VIa→VIb→VIIa→VIIIa→Ia may also be carried out with the corresponding 3α,3β-(ethylenedithio), 3α,3β- dimethoxy- or -diethoxy, or 3α,3β-dimethylthio- or -diethylthio derivatives described above to yield the corresponding 3α,3β-(ethylenedithio)-, 3α,3β - dimethoxy- or -diethoxy-, or 3α,3β-dimethylthio- or -diethylthio-4α,8,14-trimethyl - 18 - nor - 5α,8α,9β,13α,14β,17α-pregnan-20-one, respectively.

When it is desired to obtain the compounds of Formula I in which X represents the group

in which R¹ is as defined above, the compound of Formula VIIa is treated with a lower acyl anhydride, preferably acetic anhydride in the presence of an organic base, preferably pyridine, to obtain 3α,3β-(ethylenedioxy)-4α,8,14-trimethyl-18-nor-5α,8α,9β,13α,14β-pregnan-20ξ-ol acetate (VIIb). Said last-named compound is treated with a dilute aqueous acid to remove the ketal group and to obtain 4α,8,14-trimethyl - 18 - nor - 5α,8α,9β,13α,14β-pregnan-3-one-20ξ-ol acetate (VIIc), which in turn is treated with an alkali metal borohydride, preferably sodium borohydride, to yield 3β,20ξ-dihydroxy-4α,8,14-trimethyl-18-nor-5α,8α,9β,13α,14β-pregnane 20-acetate (VIId). Treatment of said last-named compound with dihydropyran in an inert solvent, preferably chloroform, in the presence of small amounts of an acid, preferably p-toluene-sulfonic acid, yields the 3-tetrahydropyranyl ether of 3β,20ξ-dihydroxy-4α,8,14-trimethyl - 18 - nor-5α,8α,9β,13α,14β-pregnane 20-acetate (VIIe) which is treated with a base, preferably potassium hydroxide in methanol, to yield the 3-tetrahydropyranyl ether of 3β,20ξ-dihydroxy-4α,8,14-trimethyl-18-nor-5α,8α,9β,13α,14β-pregnane (VIIf). Oxidation of the 20ξ-hydroxy group of said last-named compound by treatment with an oxidizing agent in a basic medium, preferably with chromium trioxide in pyridine, yields the 3-tetrahydropyranyl ether of 3β-hydroxy-4α,8,-14-trimethyl - 18 - nor-5α,8α,9β,13α,14β-pregnan-20-one (VIIIb), which is treated with a strong base in solution in a lower alkanol, preferably aqueous potassium hydroxide in ethanol, to yield the 3-tetrahydropyranyl ether of 3β - hydroxy-4α,8,14-trimethyl-18-nor - 5α,8α,9β,13α,14β, 3β - hydroxy-4α,8,14 - trimethyl-18-nor-5α,8α,9β,13α,14β,-17α-pregnan-20-one (Ic). Said last-named compound is treated with a dilute aqueous acid to yield 3β-hydroxy-4α,8,14-trimethyl-18-nor - 5α,8α,9β,13α,14β,17α-pregnan-20-one (Id) and said last-named compound may, if desired, be treated with an aliphatic acid anhydride in the presence of a base, preferably acetic anhydride in pyridine, to yield 3β-hydroxy-4α,8,14-trimethyl - 18 - nor-5α,8α,9β,-13α,14β,17α-pregnan-20-one acetate (Ie).

The compound of this invention 3α,3β - (etyhlenedioxy) - 4α,8,14 - trimethyl - 18 - nor - 5α,8α,9β,13α,14β, 17α - pregnan - 20 - one (Ia) may be used as the starting material for the preparation of 31 - nor - protost - 24-ene-3β,20R-diol (III, R=H) in the following manner Treatment of said last-named compound with a Grignard reagent prepared from 1-chloro-, 1-bromo-, or 1-iodo-4-methyl-pent-3-ene, preferably using the 1-bromo derivative in solution in an inert solvent at a temperature of 30–100° C., preferably in diethyl ether at the reflux temperature of the mixture, followed by decomposition of the reaction mixture with aqueous ammonium chloride, extraction with a water-immiscible solvent, preferably diethyl ether, evaporation of the solvent and chromatography yields 3α,3β - (ethylenedioxy) - 31 - nor - protost - 24 - en - 20R - ol (IXa). The protective ketal group of said last-named compound is removed by treatment thereof with an aqueous acid, preferably acetic acid, followed by extraction with a water-immiscible solvent, preferably diethyl ether, evaporation of the solvent and chromatography of the residue, to yield the corresponding 3-ketone, 20R - hydroxy - 31 - nor - protost - 24-en-3-one (IXb). Reduction of the 3-keto group of said last-named compound is effected by treatment thereof with sodium borohydride in a mixture of inert solvents, preferably dimethoxyethane and methanol, extraction with a water-immiscible solvent, preferably diethyl ether, evaporation of the solvent and chloromatography of the residue, to yield 31 - nor - protost - 24 - ene - 3β,20R-diol (III, R=H).

The follow examples will illustrate this invention.

EXAMPLE 1

4α,8,14-trimethyl-18-nor-5α,8α,9β,13ξ,14β-pregn-17(20)-en-3α-ol (V)

Sodium hydride (1.38 g., suspension containing 52%) is stirred at 70° C. with dry dimethylsulfoxide (30 ml.). Ethyltriphenyl phosphonium iodide (15.6 g.) in dimethylsulfoxide (70 ml.) is added and the mixture is stirred for 30 minutes. 3α - hydroxy - 4α,8,14 - trimethyl - 18-nor - 5α,8α,9β,13α,14β - androst - 17 - one or its 13β-isomer 3α - hydroxy - 4α,8,14 - trimethyl - 18 - nor-5α,8α,9β,14β - androst - 17 - one (1.42 g.) in dimethylsulfoxide (45 ml.) is added under nitrogen and the mixture is heated to 70° C. for 12 hours. After cooling the reaction mixture is poured on water (500 ml.) and extracted three times with ether (250 ml. each). The ether layers are extracted four times with water (500 ml.), dried with magnesium sulphate and the solvent evaporated under reduced pressure. The residue is chromatographed on silica gel using benzene as solvent to yield the title compound as a mixture of the four possible isomers, NMR (CDCl₃) δ 5.15, 5.73;

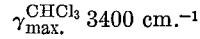

$\gamma_{max.}^{CHCl_3}$ 3400 cm.⁻¹

In the same manner, when using 3α - acetoxy - 4α,8,14-trimethyl - 18 - nor - 5α,8α,9β,14β - androst - 17 - one as starting material, the title compound is also obtained

EXAMPLE 2

4α,8,14-trimethyl-18-nor-5α,8α,9β,13ξ,14β-pregn-17(20)-en-3-one (VIa)

4α,8,14 - trimethyl - 18 - nor - 5α,8α,9β,13α,14β - pregn-17(20)en-3α-ol (2.08 g.), obtained as described in Example 1, and N,N'-dicyclohexylcarbodiimide (3.9 g.) are dissolved in dimethylsulfoxide (105 ml.), benzene (21 ml.), and pyridine (0.5 ml.). Trifluoroacetic acid (.025 ml.) is added and the mixture is stirred at room temperature for 12 hours. Ethyl acetate (50 ml.) is added, the precipitate filtered off, the filtrate extracted five times with water (100 ml.) and the water layers backwashed with ethyl acetate (50 ml.). The ethyl acetate extracts are combined, dried with magnesium sulfate, evaporated under reduced pressure, and the residue is chromatographed on silica gel using benzene as a solvent, to yield the title compound as a mixture of the four possible isomers, NMR (CDCl₃) δ 5.21;

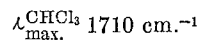

$\lambda_{max.}^{CHCl_3}$ 1710 cm.⁻¹

EXAMPLE 3

3α,3β-(ethylenedioxy)-4α,8,14-trimethyl-18-nor-5α,8α,9β,13ξ,14β-pregn-17(20)-ene (VIb)

4α,8,14 - trimethyl - 18 - nor - 5α,8α,9β,13ξ,14β - pregn-17(20)-en-3-one (0.858 g.), obtained as described in Example 2, is dissolved in benzene (60 ml.) and ethylene glycol (5 ml.) and p-toluenesulfonic acid (50 mg.) are added. The mixture is refluxed for four hours, using a water separator, cooled, taken up in benzene (500 ml.) and extracted twice with water (200 ml.). The water layers are backwashed with benzene (500 ml.), the combined benzene extracts are dried with magnesium sulfate, evaporated under reduced pressure and the residue is chromatographed on neutral alumina (30 g.) using hexane-benzene (4:1) as solvent, to yield the title compound as a mixture of the four possible isomers, NMR (CDCl₃)

δ 5.1, 4.9; the infrared absorption spectrum shows the absence of C=O and OH bands.

In the same manner, the above starting material is treated in solution in dry benzene with ethylenedithiol and a small amount of boron trifluoride etherate, or with ethylenedithiol and anhydrous hydrogen chloride, at room temperature, to yield 3α,3β - (ethylenedithio) - 4α,8,14-trimethyl - 18 - nor - 5α,8α,9β,13ξ,14β - pregn - 17(20)-ene.

Similarly, the above starting material is treated with methyl or ethyl orthoformate in the presence of methanol or ethanol to yield 3α,3β - dimethoxy- or -diethoxy - 4α,8,14 - trimethyl - 18 - nor - 5α,8α,9β,13ξ,14β - pregn-17(20)-ene.

Again in a similar manner, the above starting material is treated in solution in dry benzene with methyl or ethyl mercaptan in the presence of a small amount of boron trifluoride, or by bubbling anhydrous hydrogen chloride through the mixture, to yield 3α,3β - dimethylthio- or -diethylthio - 4α,8,14 - trimethyl - 18 - nor - 5α,8α,9β,13ξ, 14β-pregn-17(20)-ene.

EXAMPLE 4

3α,3β-(ethylenedioxy)-4α,8,14-trimethyl-18-nor-5α,8α,9β,13α,14β-pregnan-20ξ-ol (VIIa)

3α,3β - (ethylenedioxy) - 4α,8,14 - trimethyl - 18 - nor-5α,8α,9β,13α,14β - pregn - 17(20) - ene (1.578 g.), obtained as described in Example 3, is dissolved in dry tetrahydrofuran (22 ml.) and immersed in an acetone-Dry Ice bath. A solution of diborane (11 ml. 1 molar in tetrahydrofuran) is added and the mixture is kept under dry nitrogen at −60° C. for 12 hours. The reaction vessel is then immersed in an ice bath and an aqueous solution of sodium hydroxide (100 ml., 10%) is slowly added with stirring. Hydrogen peroxide (66 ml., 30%) is then slowly added and the mixture is stirred for a further 90 minutes. The reaction mixture is taken up in ether (1000 ml.) and successively washed with saturated sodium chloride solution (200 ml.), sodium bisulfite (200 ml., 10%) and saturated sodium chloride solution (200 ml.). The aqueous layers are backwashed with ether (1000 ml.), the ether extracts combined, dried with magnesium sulfate and evaporated. The residue is chromatographed on silica gel (160 g.) using benzene containing 15 percent ethyl acetate as solvent, to yield the title compound as a mixture of its 20α- and 20β- isomers which may be separated by chromatography, if desired, to give 3α,3β - (ethylenedioxy) - 4α,8,14 - trimethyl - 18 - nor-5α,8α,9β,13α,14β - pregnan - 20α - ol, M.P. 156–158° C., and 3α,3β - ethylenedioxy) - 4α,8,14 - trimethyl - 18 - nor - 5α,8α,9β,13α,14β - pregnan - 20β - ol, M.P. 187°–192° C. However, this separation is not necessary, as the mixture of both the 20α- and 20β-ols obtained in the first instance may be used as such in the subsequent step described in Example 5.

As a by-product there is obtained 3α,3β-(ethylenedioxy)-4α,8,14-trimethyl - 18 - nor - 5α,8α,9β,14β - pregn-13(17)-ene, M.P. 96–97° C. after crystallization from ether-hexane.

In the same manner, when using 3α,3β-(ethylenedithio)-, -dimethoxy-, -diethoxy-, -dimethylthio-, or -diethylthio-4α,8,14-trimethyl - 18 - nor - 5α,8α,9β,13α,14β-pregn-17(20)-one as starting material, the corresponding 3α,3β-(ethylenedithio)- -dimethoxy-, -diethoxy-, -dimethylthio-, or -diethylthio-4α,8,14-trimethyl-18-nor-5α,8α,9β,13α,14β-pregnan-20ξ-ols are also obtained.

EXAMPLE 5

3α,3β-(ethylenedioxy)-4α,8,14-trimethyl-18-nor-5α,8α,9β, 13α,14β-pregnan-20-one (VIIIa)

The mixture of the two isomeric 3α,3β-(ethylenedioxy)-4α,8,14-trimethyl-5α,8α,9β,13α,14β-pregnan - 20ξ-ols (162 mg.), obtained as described in Example 4, is dissolved in pyridine (2 ml.), chromium trioxide (200 mg.) is added and the mixture is stirred for 12 hours at room temperature. After addition of benzene (20 ml.) and methanol (0.5 ml.) the precipitate is filtered off, washed with benzene (20 ml.) and the filtrates extracted 5 times with water (20 ml.). The water layers are backwashed with benzene (50 ml.), the benzene layers dried with magnesium sulfate, evaporated under reduced pressure and the residue is crystallized from acetone-hexane to yield the title compound with M.P. 181–183° C.

In the same manner, by using 3α,3β-(ethylenedithio)-, -dimethoxy-, -diethoxy-, -dimethylthio-, or -diethylthio-4α, 8,14-trimethyl-5α,8α,9β,13α,14β-pregnan-20-ol as starting material, the corresponding 3α,3β-(ethylenedithio)-, -dimethoxy-, -diethoxy-, -dimethylthio-, or -diethylthio-4α, 8,14-trimethyl-18-nor - 5α,8α,9β,13α,14β-pregnan-20-ones are also obtained.

EXAMPLE 6

3α,3β-(ethylenedioxy)-4α,8,14-trimethyl-18-nor-5α,8α,9β, 13α,14β,17α-pregnan-20-one (Ia)

3α,3β-(ethylenedioxy)-4α,8,14-trimethyl - 5α,8α,9β,13α, 14β-pregnan-20-one (100 mg.), obtained as described in Example 5, is dissolved in 1 N potassium hydroxide in ethanol (5 ml.) and stirred under nitrogen at room temperature for one hour. The mixture is taken up in ether (100 ml.) and extracted five times with water (50 ml.). The aqueous phase is backwashed with ether (100 ml.), the ether extracts combined, dried with magnesium sulfate, and evaporated. The residue is crystallized from acetone-hexane to yield the title compound with M.P. 149–150° C.

In the same manner, by using 3α,3β-(ethylenedithio)-, -dimethoxy-, -diethoxy-, -dimethylthio-, or -diethylthio-4α,8,14-trimethyl-18-nor - 5α,8α,9β,13α,14β - pregnan-20-one as starting material, the corresponding 3α,3β-(ethylenedithio)-, -dimethoxy-, -diethoxy-, -dimethylthio-, or -diethylthio - 4α,8,14-trimethyl-18-nor-5α,8α,9β,13α,14β,17α pregnan-20-ones are also obtained.

EXAMPLE 7

4α,8,14-trimethyl-18-nor-5α,8α,9β,13α,14β,17α-pregnane-3,20-dione (Ib)

3α,3β-(ethylenedioxy)-4α,8,14-trimethyl - 5α,8α,9β,13α, 14β,17α-pregnan-20-one (87 mg.), obtained as described in Example 6, is dissolved in tetrahydrofuran (3 ml.), acetic acid (0.5 ml.) and water (0.5 ml.) are added, the mixture is refluxed for 6 hours, and taken up in ether (25 ml.). The ether solution is washed twice with saturated sodium bicarbonate (10 ml.) and twice with saturated sodium chloride (10 ml.) solutions, the aqueous phase is backwashed with ether (25 ml.), the ether extracts are combined, dried with magnesium sulfate and evaporated, to yield the title compound with M.P. 161–165° C. after crystallization from acetone-hexane.

Similarly, when using 3α,3β-(ethylenedithio)-, -dimethoxy-, -diethoxy-, -dimethylthio-, or -diethylthio-4α,8,14-trimethyl-18-nor - 5α,8α,9β,13α,14β,17α-pregnan-20-one as starting material, the title compound is also obtained.

EXAMPLE 8

3α,3β-(ethylenedioxy)-31-nor-protost-24-en—20R-ol (IXa)

Magnesium (73 mg.) is suspended in dry ether (3 ml.) and 1-bromo-4-methyl-pent-3-ene (490 mg.) dissolved in dry ether (2 ml.) is slowly added. After completion of the reaction 3α,3β-(ethylenedioxy)-4α,8,14-trimethyl-18-nor-5α,8α,9β,14β,17α-pregnan-20-one (270 mg.), obtained as described in Example 6, in dry tetrahydrofuran (5 ml.) is added. The mixture is refluxed for 1 hour, cooled to 0° C. and saturated ammonium chloride solution (10 ml.) is added. The reaction mixture is taken up in ether (50 ml.) and washed three times with water (20 ml.). The aqueous phase is backwashed with ether, the ether extracts combined, dried and evaporated. The residue is chromatographed on silica gel (30 g.) using benzene containing 5 percent ethyl acetate as solvent, to yield the title compound as an oil, with a mass spectrum showing the main peak at 472 (calc. 472) and major peaks at 472→457+(+CH₃) and at 472→454+(+H₂O).

EXAMPLE 9

20R-hydroxy-31-nor-protost-24-en-3-one (IXb)

3α,3β-(ethylenedioxy)-31-nor-protost - 24 - en—20R-ol (95 mg.), obained as described in Example 8, is dissolved in tetrahydrofuran (3 ml.), acetic acid (0.5 ml.), and water (0.5 ml.). The mixture is refluxed for 6 hours, taken up in ether (20 ml.), washed twice with saturated sodium bicarbonate solution (10 ml.) and twice with saturated sodium chloride solution (10 ml.). The aqueous phase is backwashed with ether (20 ml.), the ether extracts are combined, dried with magnesium sulfate and evaporated. The residue is chromatographed on alumina (3 g.) to yield the title compound as an oil, $$\gamma_{max.}^{CHCl_3}\ 1710\ cm.^{-1}$$

EXAMPLE 10

31-nor-protost-24-ene-3β,20R-diol (III, R=H)

20R-hydroxy-31-nor-protost-24-en-3-one (76 mg.), obtained as described in Example 9, is dissolved in dimethoxyethane (2 ml.) and methanol (1 ml.). Sodium borohydride (100 mg.) is added with stirring and stirring is continued for one hour. The reaction mixture is taken up in ether (20 ml.) and washed 3 times with saturated sodium chloride solution (20 ml.). The ether phase is dried with magnesium sulfate, evaporated, and chromatographed on silica gel (8 g.) using benzene containing 10 percent ethyl acetate as solvent, to yield the title compound with a mass spectrum showing the main peak at 430 (calc. 430) and major peaks at 430→415+(+CH₃) and 430→412+(+H₂O).

EXAMPLE 11

3β-hydroxy-4α,8,14-trimethyl - 18 - nor-5α,8α,9β,13α,14β, 17α-pregnan-20-one (Id) and its 3-tetrahydropyranyl ether (Ic) and 3-acetate (Ie)

3α,3β - (ethylenedioxy) - 4α,8,14 - trimethyl - 18 - nor-5α,8α,9β,13α,14β - pregnan - 20ξ - ol (VIIa, 205 mg.) is dissolved in 2 ml. acetic anhydride and 2 ml. pyridine, and allowed to stand at room temperature for 16 hours. The mixture is poured into ice-water, extracted with ether, the ether extracts are washed with 10% sodium bicarbonate and water, dried over magnesium sulphate and evaporated to yield 3α,3β-(ethylenedioxy)-4α,8,14-trimethyl - 18 - nor - 5α,8α,9β,13α,14β - pregnan-20ξ-ol acetate (VIIb), $$\gamma_{max.}^{CHCl_3}\ 1720, 1250\ cm.^{-1}$$

Said last-named compound (200 mg.), is dissolved in tetrahydrofuran (5 ml.), acetic acid (1.0 ml.), and water (1.0 ml.). The mixture is refluxed for 6 hours, extracted with ether, the ether extracts washed with saturated sodium bicarbonate and saturated sodium chloride solutions, the aqueous phases are backwashed with ether, the ether extracts are combined, dried with magnesium sulphate and evaporated to yield 4α,8,14-trimethyl-18-nor-5α,8α,9β,13α,14β-pregnan - 3 - one - 20ξ - ol acetate (VIIc), NMR (CDCl₃) δ 2.08, 4.8.

Said last-named compound (186 mg.), is dissolved in dimethoxyethane (5 ml.) and methanol (2 ml.). Sodium borohydride (250 mg.) is added with stirring and the mixture is stirred at room temperature for one hour. Extraction with ether, washing with saturated sodium chloride solution, drying with magnesium sulphate and evaporation of the solvent yields 3β,20ξ-dihydroxy-4α,8, 14-trimethyl - 18 - nor - 5α,8α,9β,13α,14β - pregnane 20-acetate (VIId), $$\gamma_{max.}^{CHCl_3}\ 3400\ cm.^{-1}$$

NMR (CDCl₃) δ 2.08, 3.6, 4.8.

Said last-named compound (180 mg.), is dissolved in chloroform (4 ml.), dihydropyran (0.5 ml.), and p-toluenesulfonic acid (50 mg.) is added and the mixture is stirred at room temperature for four hours. Alumina powder (activity 2, 3.0 g.), is added, the mixture is stirred at room temperature for 30 minutes, filtered, the solid washed with chloroform, and the combined chloroform filtrates evaporated, to yield the 3-tetrahydropyranyl ether of 3β,20ξ - dihydroxy - 4α,8,14-trimethyl-18 - nor - 5α,8α,9β,13α,14β - pregnane 20-acetate (VIIe), NMR (CDCl₃) δ 5.0, 4.8, 4.0, 2.05.

Said last-named compound (178 mg.), is dissolved in methanol (5 ml.), and potassium hydroxide (0.5 g.) is added. The mixture is stirred at room temperature for 4 hours, taken up in ether, washed with saturated sodium chloride solution, dried over magnesium sulphate and evaporated to yield the 3-tetrahydropyranyl ether of 3β, 20ξ-dihydroxy - 4α,8,14 - trimethyl - 18 - nor-5α,8α,9β, 13α,14β-pregnane (VIIf), $$\gamma_{max.}^{CHCl_3}\ 3400\ cm.^{-1}$$

Treatment of said last-named compound (150 mg.) in solution in pyridine (3 ml.) with chromium trioxide (300 mg.) by stirring at room temperature for 16 hours, addition of methanol (1.0 ml.), extraction with ether, washing with saturated sodium chloride solution, drying over magnesium sulphate and evaporation yields the 3-tetrahydropyranyl ether of 3β-hydroxy-4α,8-14-trimethyl-18-nor-5α,8α,9β,13α,14β-pregnan-20-one (VIIIb), $$\gamma_{max.}^{CHCl_3}\ 1715\ cm.^{-1}$$

NMR (CDCl₃) δ 0.75, 0.83, 1.12, 4.05, 4.95.

Said last-named compound (105 mg.), is dissolved in 1 N potassium hydroxide in ethanol (5 ml.) and stirred under nitrogen at room temperature for one hour. The mixture is taken up in ether, washed with water, the water washings back-extracted with ether, the ether extracts combined, dried with magnesium sulphate, and evaporated to yield the 3 - tetrahydropyranyl ether of 3β - hydroxy - 4α,8,14 - trimethyl - 18 - nor-5α,8α,9β, 13α,14β,17α-pregnan - 20 - one (Ic), NMR (CDCl₃) δ 0.84, 0.91, 1.11, 4.05, 4.95.

Said last-named compound (95 mg.), is dissolved in 95% ethanol (5 ml.) and p-toluenesulphonic acid (10 mg.) is added. The mixture is stirred at room temperature for 6 hours, extracted with ether, the ether extracts washed with saturated sodium chloride, dried over magnesium sulphate and evaporated, to yield 3β - hydroxy - 4α,8,14-trimethyl - 18 - nor - 5α,8α,9β,13α,14β,17α - pregnan-20-one (Id), $$\gamma_{max.}^{CHCl_3}\ 3400, 1715\ cm.^{-1}$$

This last-named compound (58 mg.), is dissolved in acetic anhydride (1 ml.) and pyridine (1 ml.), the mixture is allowed to stand at room temperature for 16 hours, poured into ice-water, extracted with ether, the ether extracts washed with sodium bicarbonate and sodium chloride solutions, the aqueous phases backwashed with ether, the ether extracts combined, dried over magnesium sulphate and evaporated, to yield 3β-hydroxy - 4α,8,14 - trimethyl - 18 - nor - 5α,8α,9β,13α, 14β,17α-pregnan - 20 - one acetate (Ie), NMR, (CDCl₃) δ 2.1, 4.85.

I claim:

1. A compound selected from those of the formula

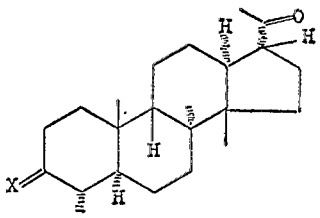

wherein X represents a divalent radical selected from the group consisting of O= (ketonic oxygen), acetals and mercaptols of the formula

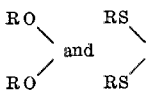

in which R represents a lower alkyl group, ketals and thioketals of the formulae

and

and the group

in which R¹ is selected from the group consisting of hydrogen, an aliphatic acyl group containing from 2 to 4 carbon atoms and the tetrahydropyranyl group.

2. 3α,3β-(ethylenedioxy)-4α,8,14-trimethyl - 18 - nor-5α,8α,9β,13α,14β,17α-pregnan - 20 - one, as claimed in claim 1.

3. 4α,8,14-trimethyl-18-nor-5α,8α,9β,13α,14β,17α-pregnane-3,20-dione, as claimed in claim 1.

4. 3β-hydroxy-4α,8,14-trimethyl - 18 - nor-5α,8α,9β,-13α,14β,17α-pregnan-20-one, as claimed in claim 1.

5. 3β-hydroxy-4α,8,14-trimethyl - 18 - nor-5α,8α,9β,13α,14β,17α-pregnan-20-one acetate, as claimed in claim 1.

6. The 3-tetrahydropyranyl ether of 3β-hydroxy-4α,8,14-trimethyl - 18 - nor-5α,8α,9β,13α,14β,17α-pregnan-20-one, as claimed in claim 1.

7. 4α,8,14-trimethyl - 18 - nor-5α,8α,9β,13ξ,14β-pregn-17(20)-en-3α-ol.

8. 4α,8,14-trimethyl - 18 - nor-5α,8α,9β,13ξ,14β-pregn-17(20-en-3-one.

9. 3α,3β-(ethylenedioxy)-4α,8,14-trimethyl - 18 - nor-5α,8α,9β,13ξ,14β-pregn-17(20)-ene.

10. 3α,3β-(ethylenedioxy)-4α,8,14-trimethyl - 18 - nor-5α,8α,9β,13α,14β-pregnan-20ξ-ol.

11. 3α,3β-(ethylenedioxy)-4α,8,14-trimethyl - 18 - nor-5α,8α,9β,13α,14β-pregnan-20-one.

12. The 3-tetrahydropyranyl ether of 3β,20ξ-dihydroxy-4α,8,14-trimethyl-18-nor-5α,8α,9β,13α,14β-pregnane.

13. The 3-tetrahydropyranyl ether of 3β-hydroxy-4α,8,14-trimethyl-18-nor-5α,8α,9β,13α,14β-pregnan-20-one.

No references cited.

HENRY A. FRENCH, Primary Examiner

U.S. Cl. X.R.
260—239.5, 397.3, 397.4, 397.5